(12) United States Patent
Vogel et al.

(10) Patent No.: US 12,085,407 B2
(45) Date of Patent: Sep. 10, 2024

(54) UPDATING A 3D MAP OF AN ENVIRONMENT

(71) Applicant: Microsoft Technology Licensing, LLC, Redmond, WA (US)

(72) Inventors: Christoph Vogel, Zurich (CH); Jan-Willem Buurlage, Zurich (CH); Johannes Lutz Schonberger, Zurich (CH); Juan Ignacio Nieto Couadeau, Zurich (CH); Marc Andre Leon Pollefeys, Zurich (CH); Timon Esli Knigge, London (GB); Marcel Nicolas Geppert, Zurich (CH)

(73) Assignee: Microsoft Technology Licensing, LLC., Redmond, WA (US)

( * ) Notice: Subject to any disclaimer, the term of this patent is extended or adjusted under 35 U.S.C. 154(b) by 92 days.

(21) Appl. No.: 17/743,430

(22) Filed: May 12, 2022

(65) Prior Publication Data

US 2023/0366696 A1    Nov. 16, 2023

(51) Int. Cl.
*G01C 21/00* (2006.01)
*G06T 17/05* (2011.01)

(52) U.S. Cl.
CPC ...... *G01C 21/3811* (2020.08); *G01C 21/3848* (2020.08); *G06T 17/05* (2013.01)

(58) Field of Classification Search
CPC .. G01C 21/3811; G01C 21/3848; G06T 17/05
See application file for complete search history.

(56) References Cited

U.S. PATENT DOCUMENTS

| 2017/0352159 | A1* | 12/2017 | Aravkin ............... B64U 10/13 |
| 2020/0027274 | A1* | 1/2020 | Suzuki ................... G06F 3/011 |
| 2020/0284590 | A1* | 9/2020 | Chen ................. G01C 21/3841 |
| 2021/0003398 | A1* | 1/2021 | Ramakrishnan ...... G01C 21/20 |
| 2021/0274358 | A1* | 9/2021 | Shankar ............... H04W 88/08 |

(Continued)

OTHER PUBLICATIONS

"International Search Report and Written Opinion issued in PCT Application No. PCT/US23/013445", Mailed Date: Aug. 21, 2023, 16 Pages.

(Continued)

*Primary Examiner* — Anne Marie Antonucci
*Assistant Examiner* — Jordan T Smith
(74) *Attorney, Agent, or Firm* — Barta Jones, PLLC

(57) ABSTRACT

A 3D map comprising sensor data items depicting the environment is updated, each sensor data item having one or more associated variables such as a pose of a capture device or a position of a landmark. A graph is calculated from sensor data items. The graph comprises nodes and edges, a node representing at least one variable in the received sensor data items and an edge representing relationships between variables. The graph is partitioned into a plurality of subgraphs so as to reduce a number of variables that are shared between subgraphs. Each of the plurality of subgraphs is allocated to a respective worker node. At each worker node, updated values of the variables are computed. The process updates values of variables which are shared between subgraphs to a common value using a consensus process. The 3D map of the environment is updated according to the updated values of the variables.

19 Claims, 9 Drawing Sheets

(56) References Cited

U.S. PATENT DOCUMENTS

2022/0066456 A1* 3/2022 Ebrahimi Afrouzi .................. B25J 9/1697

OTHER PUBLICATIONS

Catalyurek, et al., "A Fine-Grain Hypergraph Model for 2D Decomposition of Sparse Matrices", In Journal of International Parallel & Distributed Processing Symposium, vol. 1, Apr. 23, 2001, 6 Pages.

Cadena, et al., "Past, Present, and Future of Simultaneous Localization and Mapping: Toward the Robust-Perception Age", In Journal of IEEE Transactions on Robotics, vol. 32, Issue 6, Dec. 2016, pp. 1309-1332.

Carlone, et al., "Initialization Techniques for 3D SLAM: A Survey on Rotation Estimation and its use in Pose Graph Optimization", In Proceedings of IEEE International Conference on Robotics and Automation, May 26, 2015, pp. 4597-4604.

Catalyurek, et al., "Hypergraph-Partitioning-Based Decomposition for Parallel Sparse-Matrix Vector Multiplication", In Journal of IEEE Transactions on Parallel and Distributed Systems, vol. 10, Issue 7, Jul. 1999, pp. 673-693.

Eriksson, et al., "A Consensus-Based Framework for Distributed Bundle Adjustment", In Proceedings of the IEEE Conference on Computer Vision and Pattern Recognition, Jun. 2016, pp. 1754-1762.

Hong, et al., "Convergence Analysis of Alternating Direction Method of Multipliers for a Family of Nonconvex Problems", In SIAM Journal on Optimization, vol. 26, Issue 1, 2016, pp. 337-364.

Themelis, et al., "Douglas-Rachford Splitting and ADMM for Nonconvex Optimization: Tight Convergence Results", In SIAM Journal on Optimization, vol. 30, Issue 1, Jan. 9, 2020, 30 Pages.

Triggs, et al., "Bundle Adjustment—A Modern Synthesis", In Proceedings of International Workshop on Vision Algorithms, Sep. 2000, 72 Pages.

Demmel, et al., "Distributed Photometric Bundle Adjustment", In Proceedings of the International Conference on 3D Vision (3DV), Nov. 25, 2020, pp. 140-149.

"Invitation to Pay Additional Fees Issued in PCT Application No. PCT/US23/013445", Mailed Date: Jun. 19, 2023, 9 Pages.

* cited by examiner

UPDATING A 3D MAP OF AN ENVIRONMENT

BACKGROUND

A 3D map of an environment is a collection of 3D positions in the environment and captured images associated with the 3D positions. The associations either result from the captured images depicting landmarks at 3D positions in the environment or from the images having been captured by capture devices with 3D positions and orientations in the environment. The environment which is mapped is any indoor or outdoor environment such as a domestic home, an office interior, a garden, a public rail station or other environment.

3D maps are used in a large range of applications and a non-exhaustive list of example applications is: navigation, hologram persistence, augmented reality, digital twins of buildings or other environments.

The embodiments described below are not limited to implementations which solve any or all of the disadvantages of known methods of updating a 3D map of an environment.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a method for updating a 3D map of an environment, the 3D map comprising sensor data items depicting the environment, each sensor data item having one or more associated variables. As described herein, one example of an associated variable is a pose of a capture device. Another example of an associated variable is a position of a landmark. At a management node of a communications network, sensor data items are received. A sensor data item is typically any data item that has been captured by a capture device. A graph is calculated based at least in part on the received sensor data items. For example, the received data is used to calculate the graph. The calculated graph comprises nodes and edges, a node representing at least one variable in the received sensor data items and an edge representing relationships between variables. The management node of the communications network partitions the graph into a plurality of subgraphs. The graph is partitioned so as to reduce a number of variables that are shared between subgraphs. Each of the plurality of subgraphs is allocated to a respective worker node of the communications network. At each worker node, updated values of the variables are computed. The process updates values of variables which are shared between subgraphs to a common value using a consensus process. The 3D map of the environment is updated according to the updated values of the variables.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1A:
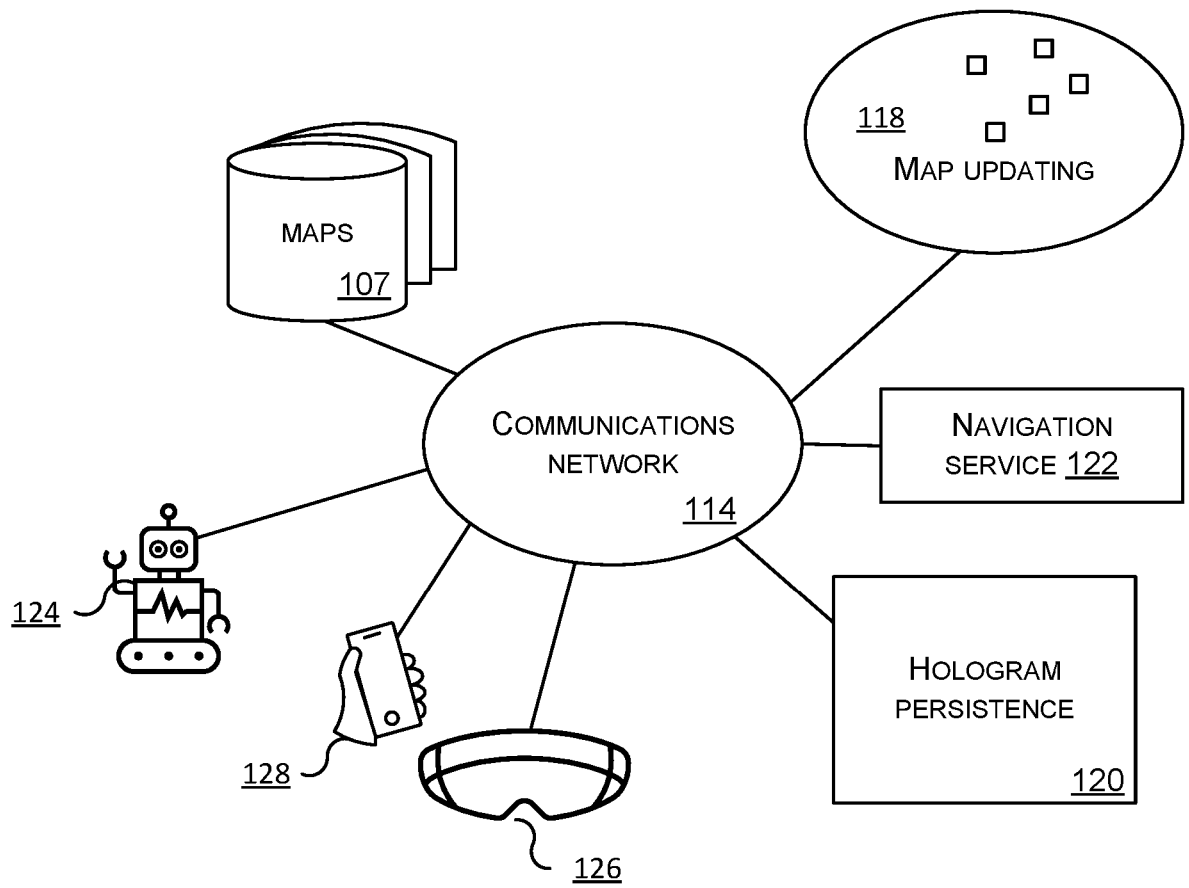
FIG. 1A is a schematic diagram of map updating functionality deployed as a cloud service.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

As mentioned above, 3D maps are used in a wide range of applications and there is an ongoing desire to improve the accuracy and/or scale of such maps in order to improve the performance of the applications using the 3D maps. Navigation for example is an application where accuracy is extremely important since inaccurate navigation of a robot leads to physical damage of the robot and/or objects in the environment. Hologram persistence is also an application where accuracy of 3D maps is very important. In a scenario where a hologram of a person is being projected as part of a video conferencing application in mixed reality, the hologram has to be inserted into the local environment of a viewer in a realistic manner, taking into account the local physical environment of the viewer. In order to achieve this the local physical environment has to be accurately represented in a 3D map. The scale of 3D maps is also important since navigating a robot in an environment becomes very difficult in regions of the environment which are not represented in the 3D map. Similarly, persisting a hologram in a region of the environment outside the knowledge of a 3D map is not possible.

In order to construct 3D maps, sensor data is used such as images, inertial measurement unit data, videos, depth sensor data and more. The sensor data available is typically from a variety of different capture devices and obtained at different times, in different ambient conditions and from different viewpoints. More detail about captured sensor data obtained for 3D map construction is explained with reference to FIG. 1A and FIG. 2 later in this document. With the increasing size and variety of sensor data captured by capture devices, a move to a distributed architecture for 3D map building and updating is beneficial. Modern 3D map building and updating methods often use long-term storage of numerous sensor data items and storage of landmarks included therein.

As explained above, a 3D map is a collection of 3D positions in the environment and captured images associated with the 3D positions. The images are any suitable type of image such as video frame, depth camera frame, web cam image, infra-red image. The granularity of the map is affected by the number of 3D positions and their spread over regions of interest of a volume being mapped.

Given a 3D map, it is possible to query the 3D map with image data depicting objects or surfaces in the mapped environment and retrieve a 3D position and orientation of a capture device which captured the image data. It is also possible to query the 3D map with a 3D position and orientation and to retrieve image data associated with the 3D position. 3D map query results are used for navigation, hologram persistence or other tasks.

The accuracy of a 3D map is affected by the ability of the map to explain the collection of captured sensor data in a coherent and consistent manner. In various examples described herein optimization is carried out over the collection of captured sensor data (more specifically, over poses and/or landmarks derived from the captured sensor data) in order to find a 3D map which explains the sensor data in a coherent and consistent manner. During the optimization values of poses and/or positions in the map are adjusted to best explain a whole collection of many captured sensor data items. Explaining a whole collection of captured sensor data cannot be achieved by independently processing cut-outs of the data, as this would lead to inconsistent results and consider only incomplete information. On the contrary, substantially the whole data is to be considered in the optimization process. 3D map optimization is difficult to achieve accurately and in a scalable manner which scales up to enable maps of large areas to be computed such as maps of an entire city block or full city.

As described herein, a landmark is any object or part of an object located within an environment and includes permanent objects whose positions remain fixed relative to their environment over a substantial period of time. A non-exhaustive list of examples of landmarks is: furniture, visual patterns on walls, doors, windows. A landmark has a 3D position in a coordinate frame such as a world coordinate frame, a camera coordinate frame or other coordinate frame.

The term "pose" refers to an orientation and 3D position in a coordinate frame such as a world coordinate frame or other coordinate frame. In various examples, the pose is a 6 degree of freedom (6DOF) pose.

In various examples there is a method for updating a 3D map of an environment, the 3D map comprising sensor data items depicting the environment, each sensor data item having one or more associated variables. As described herein, one example of an associated variable is a pose of a capture device. Another example of an associated variable is a 3D position of a landmark. At a management node of a communications network, sensor data items are received. A sensor data item is typically any data item that has been captured by a capture device. A graph is calculated based at least in part on the received sensor data items. For example, the received data is used to calculate the graph. The calculated graph comprises nodes and edges, a node representing at least one variable in the received sensor data items and an edge representing relationships between variables. The management node of the communications network partitions the graph into a plurality of subgraphs. The graph is partitioned so as to reduce a number of variables that are shared between subgraphs. Each of the plurality of subgraphs is allocated to a respective worker node of the communications network. At each worker node, updated values of the variables are computed. A consensus process such as a consensus-based proximal algorithm is used to update values of the variables which are shared between subgraphs. The 3D map of the environment is updated according to the updated values of the variables.

By using local computation at the worker nodes as part of a consensus-based proximal algorithm there is ability to compute accurate 3D maps in a distributed manner which is efficient and scalable. The term "proximal" here means that the local computation tries to keep the shared variables close to the previous consensus values. The proximal step and consensus step happen in an alternating fashion. The generated 3D map has the same quality as a map computed using the same data and an equivalent non-distributed algorithm.

A consensus-based proximal algorithm is a process that makes use of proximal operators to solve optimization problems involving consensus constraints that enforce the equality of given groups of variables. A consensus-based proximal algorithm is combines two ideas, consensus-based methods and proximal optimization. Consensus based methods split a large optimization problem into sub-problems that can be solved independently and alternates optimization of the sub-problem with optimizing the consensus between them, making shared (duplicated) variables agree. The Augmented Lagrangian method is an example which augments linear consensus terms implemented via Lagrangian multipliers with quadratic coupling terms. Proximal optimization can denote the idea to solve an optimization problem in multiple steps, each time adding a quadratic term to the original problem that forces the variable updates to be close to their previous solution, implemented with Bregman distance, which usually manifests as a simple quadratic per variable. Doing so renders the original problem strongly convex, which allows for exact and efficient optimization. Consensus-based proximal algorithms combine both processes. One example of a consensus-based proximal algorithm is ADMM, which combines the Augmented Lagrangian with proximal optimization, again usually leading to additional quadratic and linear terms added to the original problem. Douglas-Rachford splitting DRS is another example of a consensus-based proximal algorithm. Being a classical proximal method DRS can be shown, augmented with respective linear consensus constraints, to be equivalent to ADMM, even in the non-convex domain, meaning a non-convex original problem.

By partitioning a graph comprising information relating to values of variables associated with sensor data items, as well as information corresponding to relationships between variables, into a plurality of subgraphs, a size and complexity of a respective optimization problem to be solved is reduced. Moreover, each subgraph is allocated to a worker node such that each subgraph is optimized at a single node. In decentralizing the computation of the updated variables, the graph is optimized faster and more efficiently than if it were to be optimized at a single node, and scalability is achieved. It is expected that with the digital transformation of the world, the size of digital maps representing the physical world will increase tremendously.

Because the graph is partitioned so as to reduce a number of variables that are shared between subgraphs, there is reduced communication volume. That is, there is reduced traffic between the worker nodes.

Partitioning the graph so as to reduce a number of variables that are shared between subgraphs improves the functioning of the underlying computer devices; at least by enabling scalability so that maps of large areas such as cities are optimizable.

In some cases the graph is a pose graph (where each node represents a pose of a capture device) and the optimization is a pose graph optimization. In some cases the graph is a co-visibility graph where each node represents poses of capture devices which captured images depicting a specified landmark. In the case of the co-visibility graph, the optimization computed at the worker nodes is a bundle adjustment process. A bundle adjustment process minimizes the reprojection error between the image locations of observed and predicted landmarks. Predicted landmark positions are predicted using a capture device model such as any conventional capture device model.

Optimization of a 3D map involves the calculation of a graph comprising information about poses and/or landmarks captured by a capture device is the task of estimating a 3D position or orientation of the capture device and/or of estimating a position landmark captured by the capture device with respect to a 3D map. In some instances, a preliminary 3D map is pre-built and the optimization of the 3D map comprises updating values of variables in the graph. In other instances, the graph is used to generate the 3D map.

The optimization of a 3D map is a fundamental building block to enable virtual reality/augmented reality/mixed reality systems (VR/AR/MR) that allow users to interact with an accurate depiction of a 3D environment. Accurate 3D maps are also desired for many applications including robotics, navigation, and more. Due to, for example, noise in images captured by capture devices, errors in calculating a position and/or orientation of a capture device and differences in relative data relating to landmarks captured by capture device, 3D maps generated or updated from such captured data may be inaccurate.

In any combination of the examples herein, at each worker node, the process of computing updated values of variables of the subgraph comprises computing an optimization of the subgraph as part of the consensus-based proximal process, and wherein, during the consensus-based proximal process, for at least one worker node, the optimization of the subgraph stops before reaching convergence. This enables significant acceleration of the map updating process since it is not necessary to wait for each subgraph (referred to as a local problem) to be solved before obtaining an updated 3D map. Alternative inferior approaches solve each local problem until convergence every time.

In any combination of the examples herein the method comprises repeatedly alternating the steps of: (i) computing the subgraph optimization at the worker nodes and (ii) update the shared variables to a common value using a consensus process. The method further comprises using a variable number of optimization steps at the subgraph optimization at the worker nodes and using a variable number of optimization steps of the consensus process. Allowing for a variable number of steps per local problem and in each global step (where an iteration of the consensus-based proximal algorithm is a global step) allows for a very flexible treatment of the individual steps per worker node and accelerates the optimization process significantly. Note that the consensus problems are easily solved/solvable exactly in one step, not 'inexactly' and in multiple steps. The local updates are time and memory consuming to compute. The consensus updates are cheap, but data has to be received from the local nodes and sent back.

In any combination of the examples herein, the method comprises setting a step size of an optimization process used at each worker node according to a specified upper bound to ensure convergence but take as large as possible steps. This gives significant efficiency gains without detrimenting accuracy.

In any combination of the examples herein the subgraphs are dynamically adjusted during operation of the method according to load balancing measurements observed from the worker nodes. This gives efficiency gains since load balancing is improved.

In any combination of the examples herein, the consensus-based proximal process is decentralized. Using a decentralized consensus-based proximal process is found to give significant efficiency and enable larger 3D maps to be updated and/or computed.

In contrast to approaches which designate a single node with the responsibility to collect all updates, perform the consensus step update and broadcast those new consensus variables to the respective nodes, examples of the present technology use a decentralized system.

In any combination of the examples herein decentralization of the consensus-based proximal process is achieved by forming a virtual cluster of worker nodes for each variable and designating one worker node per virtual cluster to receive data from other worker nodes in the virtual cluster, use the received data to compute an update for consensus variables shared within that virtual cluster, and to send the update to the worker nodes in the virtual cluster. This gives an efficient and effective decentralized process.

In any combination of the examples herein, updating the values of variables which are shared between subgraphs comprises introducing one or more consensus terms at each worker node. The consensus-based proximal algorithm is configured to use the one or more consensus terms to ensure equality amongst the variables shared between subgraphs. This gives improved accuracy of the resulting 3D map.

In various examples, calculating the graph comprises using one or more of: odometry data indicating that two variables are to be connected by an edge because their associated sensor data items were captured sequentially according to the odometry data, and shared observations between captured images indicating that two variables are to be connected by an edge. These are found to be effective ways of constructing the graph which are workable and practical.

In some examples of the methods and systems described herein, computing updated values of variables of the subgraph at a worker node comprises computing an optimization so as to assign a position and orientation in three dimensional world space to each pose in the subgraph in a manner that conforms as much as possible to the sensor data items. Thus each worker node computes a local problem which is an optimization of the subgraph assigned to the worker node.

In various examples, a Gauss-Newton process or Levenberg-Marquardt process is used to compute the optimization at a worker node. These processes are found to be particularly effective in practice and to give accurate results.

In some examples, the consensus-based proximal process comprises Alternating Direction Method of Multipliers (ADMM) or Douglas Rachford Splitting (DRS). These processes are found to be particularly effective in practice and to give accurate results.

In various examples, the graph is either a pose graph where each node represents a pose of a capture device and edges represent relationships between poses, or the graph is a co-visibility graph where each node represents all capture devices which observe a particular landmark.

The capture device is any one or more of: a camera, a light detection and ranging device LIDAR, an infrared camera, a time-of-flight camera, or an inertial measurement unit, IMU. By using different types of capture device the variety of sensor data is increased and the accuracy of the resulting map is improved.

In any combination of the examples herein, the updated 3D map of the environment is used to create a digital twin of a real-world environment. This is useful for creating digital twins of buildings which are to be used for automated building management and control.

In any combination of the examples herein, the updated 3D map of the environment is used for navigation of a human and/or robot. A navigation application is able to query the updated 3D map in order to plan routes, guide an entity on a journey in the environment by providing directions to a human and/or controlling a robot.

In any of the examples, the updated 3D map of the environment is used to persist a hologram. Sharing and persisting holograms over time and/or across mixed reality devices is used in various mixed reality applications.

In any of the examples, the updated 3D map of the environment is used for mobile camera localization. Mobile camera localization is the task of receiving sensor data from a mobile camera and using the sensor data to determine a 3D position and orientation of the camera relative to the 3D map.

Existing methods for 3D map optimization experience a severe bottleneck when processing large amounts of data and are less flexible to the adaptations required for the growing amount of input data.

The technology described herein comprises a new method for updating a 3D map of an environment that requires low memory footprint, scales to an arbitrary size and outperforms existing 3D map optimization methods. 3D maps are updated to take into account changes in the environment and/or to take into account sensor data which was not previously available.

FIG. 1A is a schematic diagram of map updating functionality 118 deployed as a cloud service. The map updating functionality is deployed using a distributed architecture comprising a plurality of worker nodes and a management node which are in communication with one another. In an example the worker nodes and management node are deployed in a data centre, cluster of compute nodes or other computing functionality. The map updating functionality receives captured sensor data from one or more sensors via communications network 114. The sensors comprise inertial measurement units such as in smart phone 128, robot 124, augmented reality head worn computing device 126 or other sensors connected to communications network 114. The map updating functionality has access to one or more 3D maps 107 stored at locations accessible via communications network 114. The map updating functionality 118 updates and/or creates one or more of the 3D maps 107.

The 3D maps 107 are accessible via communications network 114, such as by a hologram persistence service 120 and by a navigation service 122. In an example, navigation service 122 is able to send a query to the 3D maps 107 to find image data associated with a given 3D position, or find a 3D position associated with a given image. In another example, navigation service 122 is able to download a region of a 3D map or a whole 3D map in order to plan routes and give directions to an end user, such as a user of smart phone 128, head worn augmented reality device 126, or robot 124.

In an example, hologram persistence service 120 is able to send a query to the 3D maps 107 to find image data associated with a given 3D position, or find a 3D position associated with a given image. The hologram persistence service uses the retrieved data to persist holograms over time and/or over multiple augmented-reality head worn computing devices.

Figure 1B:
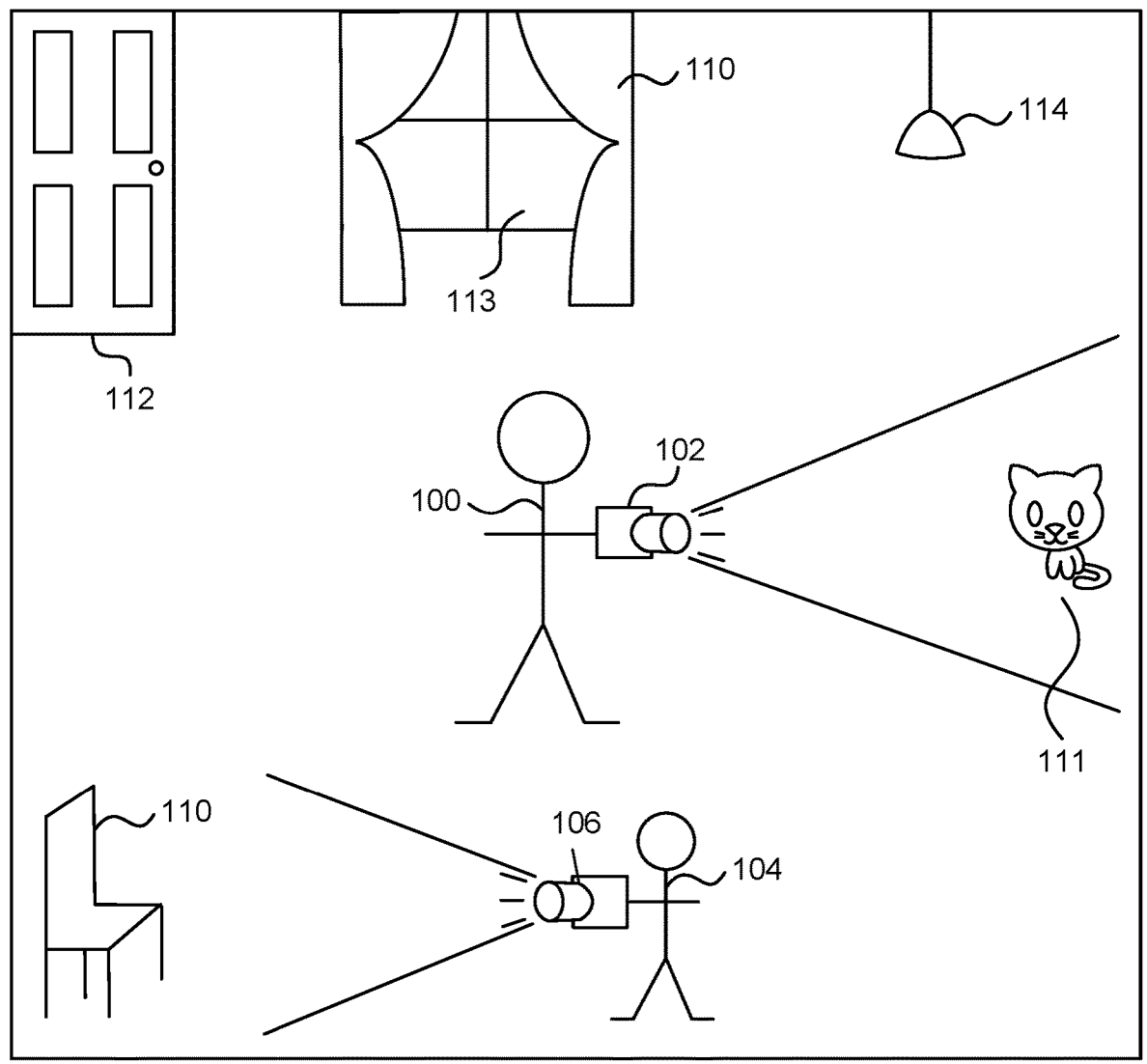
FIG. 1B is a schematic diagram of two people in a room, each holding a mobile depth camera which may be used to produce a 3D model or map of the room and optionally for real-time camera tracking.
Figure 2:
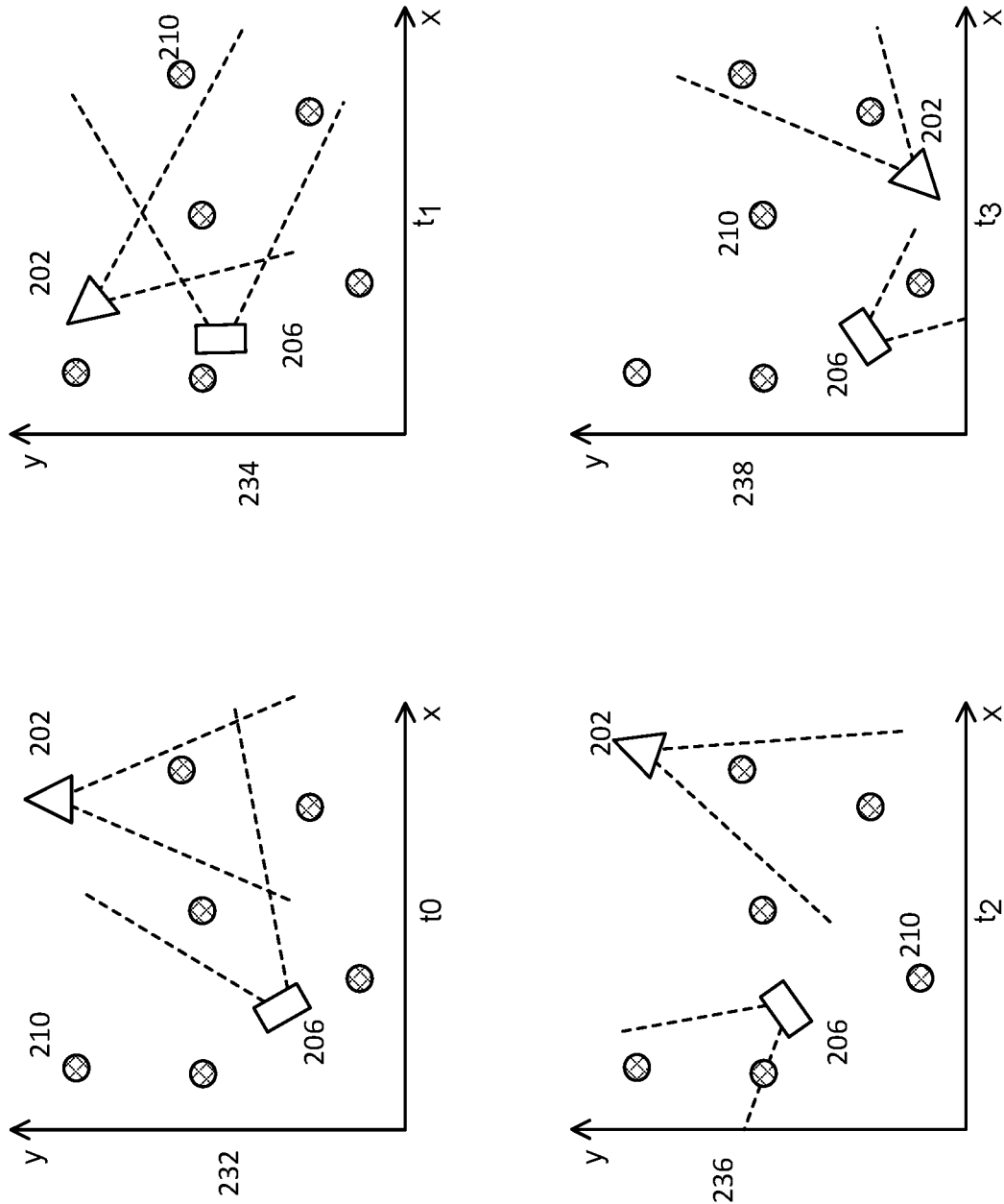
FIG. 2 is a diagram showing a position of two mobile cameras and associated objects within a scene at four different points in time.

Detail about how sensor data is obtained for use in updating and/or computing 3D maps is now given with reference to FIGS. 1 and 2.

FIG. 1B is a schematic diagram of a first person 100 standing in a room holding a first capture device 102. In the room, there is also stood a second person 104 holding a second capture device 106. In the room, there are a plurality of objects/landmarks. FIG. 1B depicts six such objects but is not limited thereto. In FIG. 1B, two types of objects are shown. The first type of object is a static object, that is, an object whose position does not substantially change with time. Static objects in the room of FIG. 1B are door 112, window 113 and lighting fixture 114. The second type of object is a moving object, that is, an object whose position may change over time. Moving objects depicted in FIG. 1B are chair 110 and cat 111. The first person 100 and the second person 104 as well as the capture devices 102, 106 are also examples of a moving object.

In FIG. 1B, as either person 100 or 104 moves around the room, the capture device captures sensor data depicting the environment which in this case is a room of a domestic home. From such sensor data, 3D position and orientation of the capture device is computed and/or 3D positions of landmarks within the 3D environment are computed using any conventional well known tracking technology. The sensor data is one or more of: images, inertial measurement unit measurements, accelerometer measurements, gyroscope measurements, global positioning system measurements, depth data, LIDAR.

The sensor data is used to compute 3D position and orientation of the capture devices by using any suitable well known technology. For example, where the sensor data comprises images, the images are fitted to a 3D model of the environment in order to compute a pose of the capture device using a model fitting process. In another example, landmarks are pre-specified in a 3D model of the environment and are detected in the captured sensor data using a machine trained model. Where the sensor data is global positioning system data it directly provides 3D position information. Where the sensor data is IMU measurements it directly provides orientation of the capture device.

Whilst the capture device in FIG. 1B is depicted as a mobile camera, a non-exhaustive list of other capture devices is: a thermal camera, an infrared camera, a LiDAR, a depth camera, an inertial measurement unit (IMU) or a head-mounted device (HMD) comprising any of the aforementioned capture devices.

FIG. 2 is a diagram showing a position of two mobile cameras 202, 206 and associated objects 210 within an environment at four different points in time: $t_0$, $t_1$, $t_2$ and $t_3$. Each graph 232, 234, 236 and 238 depicts a plan view of the cameras 102, 106. As can be seen in each graph, each camera 202, 206 has a field of view of objects in the environment as shown by the dashed lines. As the cameras 202, 206 move within the environment over time, their respective views of objects, positions and orientations within the environment changes.

In some examples, odometry data, which is data about the movement of capture devices such as 202, 206 shown in FIG. 2 is available to the map updating functionality.

Figure 3:
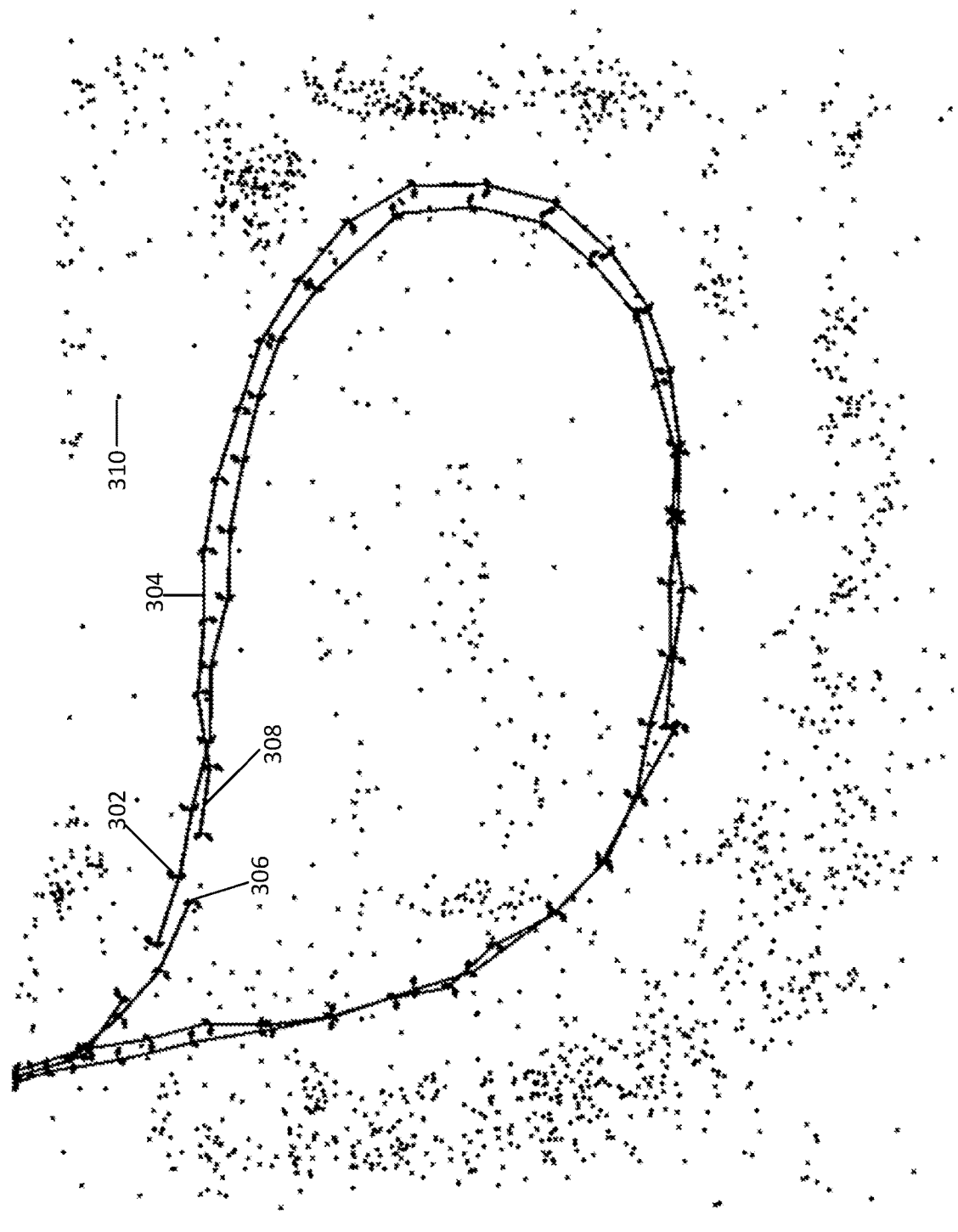
FIG. 3 is an example of a 3D map.

FIG. 3 is an example of a 3D map. The map comprises 3D positions of a plurality of landmarks 310. The map also comprises a relative trajectory of two capture devices such as captures devices 202 and 206. The solid black line 304 represents a trajectory of a first capture device. The solid black line 308 represents a trajectory of a second capture device. The solid points 302, 306 marked on each trajectory are the poses of the respective capture devices. The small black dots 310 shown in and around the trajectories 304, 308 are positions of landmarks in the environment to be optimized. In the example map of FIG. 3 there are 3D positions of landmarks and there are poses of capture devices. However, it is also possible to have a 3D map made up only of poses of capture devices, or only of 3D positions of landmarks.

Figure 4:
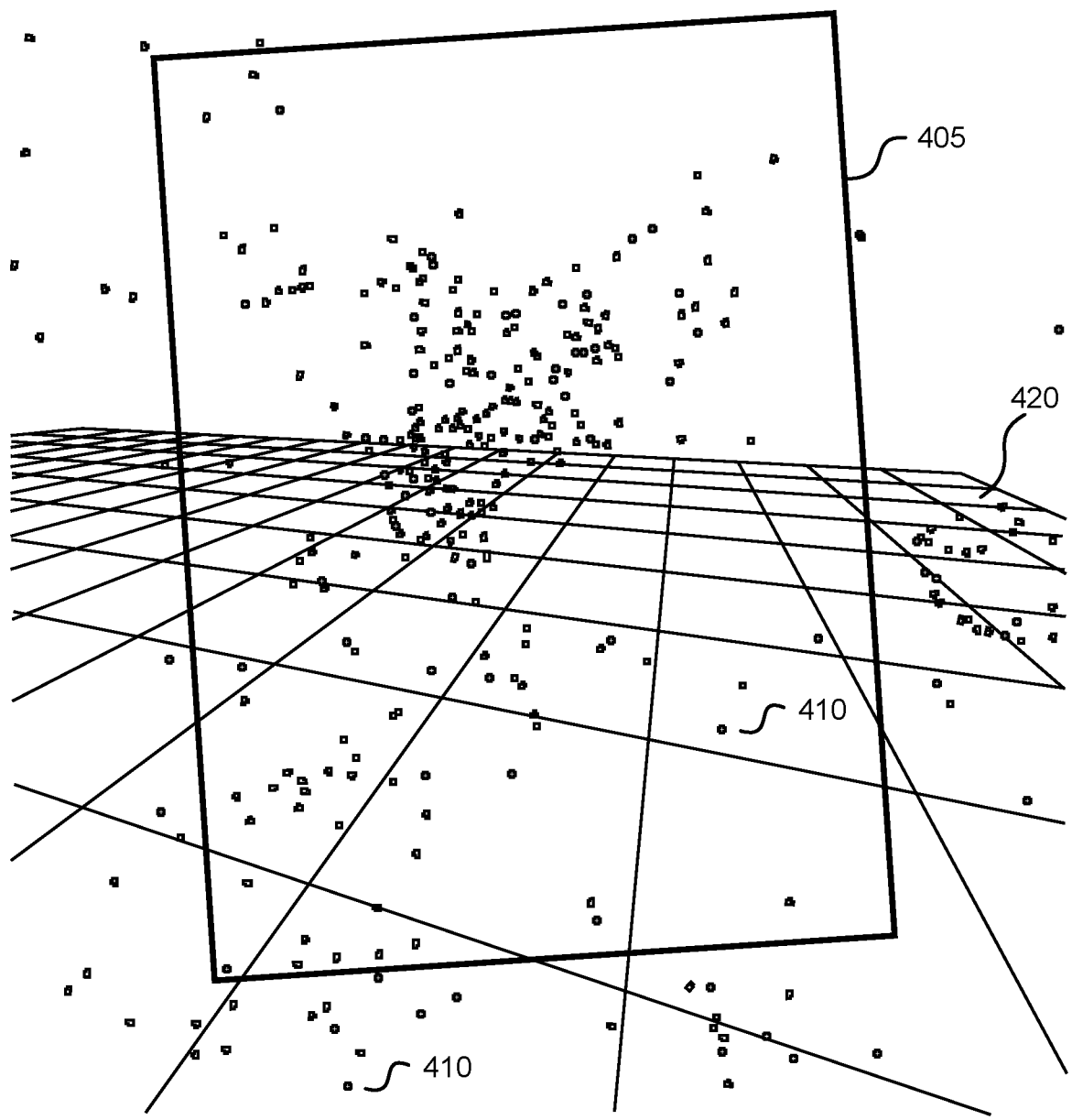
FIG. 4 is a diagram depicting an image frame and perspective of a capture device with regard to a bundle adjustment process.

FIG. 4 is an example of an image frame 405 of a capture device. In the 3D map there is knowledge about a plurality of landmarks and these are projected onto the image frame 405 using a model of the capture device and rules about light rays, optics and physics. The predicted positions of the landmarks are illustrated as dots 410 in FIG. 4 and some fall within the image frame 405 and some do not. The frame 405 is depicted relative to a floor 420 in an environment to illustrate the perspective of the image frame 405. In a bundle adjustment process at a worker node the predicted positions of the landmarks are compared to an actual image captured by the capture device. The bundle adjustment process operates to minimize the difference between the predicted landmark positions and the observed landmark positions for all capture devices represented at the given worker node. The bundle adjustment process adjusts 3D landmark positions and poses of capture devices in the 3D map so as to minimize the reprojection error.

Figure 5:
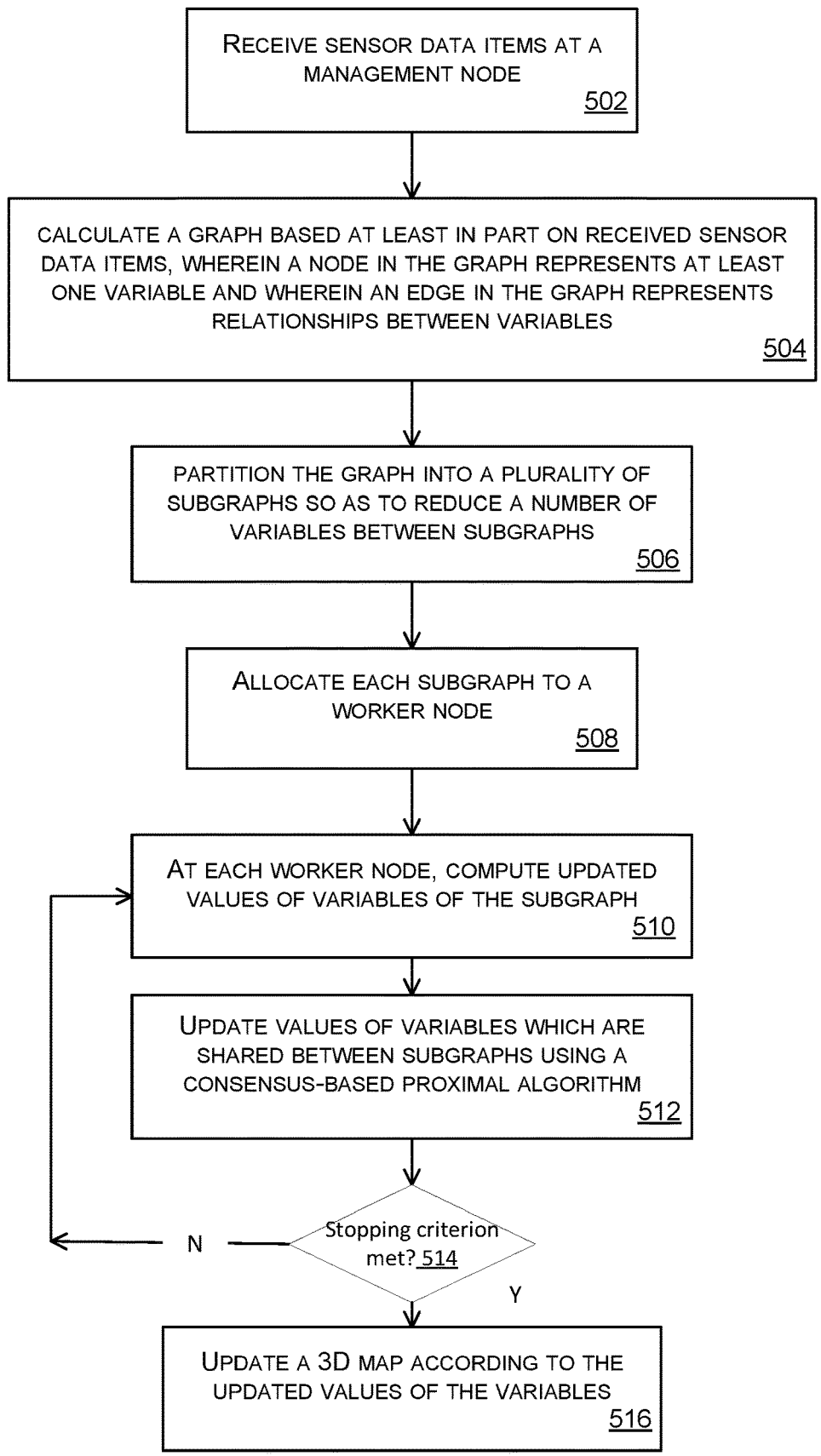
FIG. 5 is a flow diagram of a method for updating a 3D map of an environment.

FIG. 5 is a flow diagram of a method for updating a 3D map of an environment. The method of FIG. 5 is performed by a plurality of worker nodes and a management node such as in a data centre, cluster of compute nodes or other distributed computing deployment. In an example the method of FIG. 5 is performed by the map updating functionality 118 of FIG. 1A.

With reference to FIG. 5, in various embodiments there is a method for updating a 3D map. The 3D map of the environment comprises sensor data items with each sensor data item having one or more associated variables. The sensor data items are items that have been captured by one or more capture devices. As described herein, one example of an associated variable is a pose of a capture device. Another example of an associated variable is a position of a landmark.

A plurality of sensor data items are received 502 at a management node of a communication network. The communication network further comprises a plurality of worker nodes. At the management node of the communication network, a graph comprising nodes and edges is calculated 504 based at least in part on the received sensor data items. A node in the graph represents at least one variable and an edge represents relationships between variables.

In some examples the graph is a pose graph and the process of FIG. 5 computes a pose graph optimization. A pose graph is where each node of the graph represents a pose of a capture device and edges of the graph represent relationships between the poses. The output of a pose graph optimization process is a 3D map which is a plurality of values of poses of capture devices.

In other examples, the graph is a co-visibility graph where each node represents poses of capture devices which captured images depicting a specified landmark. In this case the process of FIG. 5 computes an optimization using bundle adjustment to produce a 3D map which is a plurality of values of poses of capture devices and also a plurality of 3D positions of landmarks.

At block 506, the graph is partitioned into a plurality of subgraphs so as to reduce a number of variables shared between subgraphs. As a result of the nature of the sensor data items being used to calculate a graph, the partitioning of the graph will result in at least one variable being replicated across two or more subgraphs. Therefore, when partitioning the graph into a plurality of subgraphs, this is done so as to reduce a number of variables shared between/replicated across the subgraphs. Advantageously, the fewer shared variables that are present amongst the plurality of subgraphs, the greater the decoupling between variables across the plurality of subgraphs. More detail about how the graph is partitioned is given later in this document.

At block 508, a management node (which is one of the worker nodes in some cases) allocates each of the plurality of subgraphs to a respective worker node of the communication network.

At block 510, updated values of variables of the subgraph are computed at each worker node. This is referred to as computing a local problem. The updated values of the variables are computed by computing an optimization that seeks to find values of the variables which explain the sensor data associated with the subgraph in a consistent manner.

At block 512, a consensus-based proximal algorithm is used to update values of variables which are shared between subgraphs. The consensus-based proximal algorithm seeks to compute a global optimization over the whole graph in such a way that the variables which are shared between subgraphs are constrained to be the same.

The operations at blocks 510 and 512 iterate in an interleaved manner in order to reach convergence of the global optimization. Convergence occurs when a stopping criterion is met at decision point 514. In an example the stopping criterion is where the amount of change in the values of the variables between iterations, or the norm of the gradients, fall below a threshold. Alternatively the stopping criterion is a specified number of iterations or if a time budget is exhausted.

The 3D map is updated 514 using the updated values of the variables such as by storing the values in the map store 107 of FIG. 1A.

It is understood that it is not necessary for the computation of the updated values of variable of the subgraph in block 510 and/or the updating of the values of variables which are shared between subgraphs using the consensus-based proximal algorithm in block 512 to occur simultaneously. That is, owing to the decentralized nature of the subgraph, the computation of updated values of variables and the consensus of shared variables, in some examples, the computations performed in blocks 510 and 512 are performed asynchronously.

It is understood that the communication network is not limited to having a single management node. In some examples, the computing system has two or more management nodes. Additionally, a worker node is not limited to being allocated a single subgraph. In various examples, a worker node is allocated two or more subgraphs. Where two or more subgraphs are allocated to a single worker node, it is advantageous if the two or more subgraphs fit entirely within a memory associated with the single worker node.

This method is more practical and flexible to adapt to an arbitrary scale of an environment to be mapped as a bottleneck in computing the optimization is removed. In the present method, the consensus step that is performed at block 512 is decentralized such that a single node need not perform the consensus for all variables that are shared between subgraphs. This in turn vastly increases the amount of sensor data that can be processed by a communication network.

Figure 6:
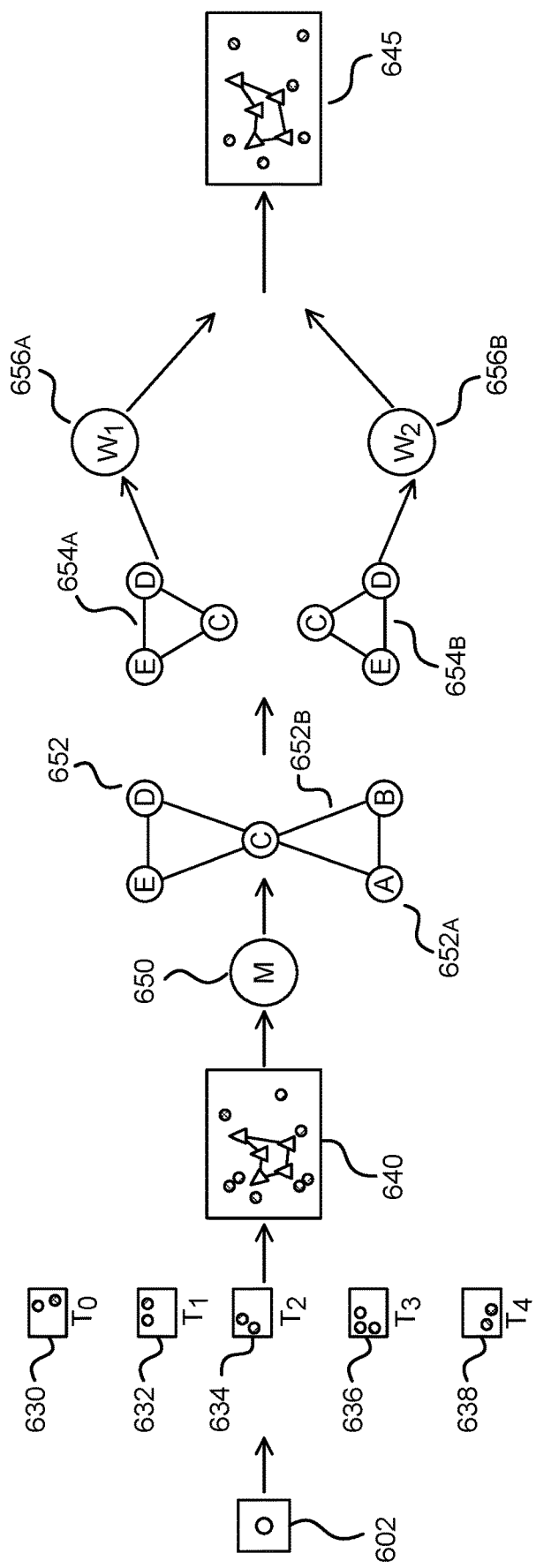
FIG. 6 is a schematic diagram of optimizing a 3D map.

FIG. 6 is a schematic diagram of optimization of a 3D map. In FIG. 6, a single capture device 602 is shown. In other examples, more than one capture device is used. However, for simplicity, FIG. 6 is depicted in terms of a single capture device 602.

In FIG. 6, capture device 602 is used to capture a series of images 630 to 638 at times $t_0$ to $t_4$ respectively. Images 630 to 638 depict landmarks captured in the image frame of 602 when the capture device has a particular position and orientation. As the capture device 602 moves through different positions and orientations at times $t_0$ to $t_4$, a 2D image position of the landmarks that are observed by the capture device 602 will vary.

As described above, the poses of the capture devices and the 3D positions of the landmarks are available from one or more of: known tracking technology, machine learning tools for predicting 3D landmark positions from 2D images, IMU data, GPS data, accelerometer data, gyroscope data or other sources. However, the poses and/or 3D landmark positions have to be optimized (to be consistent with one another) before being put into a 3D map. The 3D positions of the landmarks and poses of the capture devices which are input to the process are obtained in some cases using an initial map 640 of the environment, where the initial map is to be updated in light of the sensor data.

The sensor data items are received at management node 650. The management node 650 also receives the poses and/or 3D landmark positions.

As described in respect of blocks 504 to 508 of FIG. 5, the management node 650 calculates a graph 652 representing the received sensor data items. The graph 652 comprises nodes 652a and edges 652b, with the nodes 652a representing at least one variable and the edges representing relationships between variables. For simplicity, in FIG. 6, each node 652a corresponds to a capture device pose.

In the case where the graph is a pose graph the graph is created by assigning one pose per graph node. The graph nodes are connected by edges by connecting poses which are related through odometry data and/or by having images that depict overlapping parts of the environment.

In the case where the graph is a co-visibility graph the graph is created by having one graph node per landmark (landmark node) and one graph node for each pose of the capture devices (pose node). Edges are between a landmark node and a pose node, and each edge is associated with a (2D) position of the landmark on a captured image.

The management node 650 is configured to partition the graph into a plurality of subgraphs 654a, 654b so as to reduce a number of variables shared between subgraphs.

In the case of a pose graph, the graph is partitioned by assigning each edge to a worker node in order to minimize an amount of communication needed in a consensus step of the consensus-based proximal algorithm while keeping load balanced over the worker nodes.

In the case of a co-visibility graph, the graph is partitioned by assigning each edge to a worker node in order to minimize an amount of communication needed in a consensus step of the consensus-based proximal algorithm while keeping load balanced over the worker nodes. In addition to reducing communication volume, this also reduces coupling and improves convergence.

In FIG. 6, each subgraph is allocated, by the management node, to a respective worker node 656a and 656b. Only two worker nodes are shown although in practice there are many tens or hundreds of worker nodes. At each worker node, updated values of variables of the respective subgraph are computed. This is done by computing an optimization of the subgraph which seeks to make the poses and/or landmarks of the subgraph a consistent explanation of the sensor data as far as possible. During this process the values of the poses and or 3D landmark positions are changed.

Additionally, at each worker node, values of variables which are shared between subgraphs are updated as part of the consensus-based proximal algorithm, as described above in respect of FIG. 5. The consensus-based proximal algorithm has the function of a global optimization taking into account the values of variables in the initial map 640 as well as the values of variables received as input to the process of FIG. 6. The consensus-based proximal algorithm constrains values of variables shared between the subgraphs to be the same.

Updated values of variables from the respective worker nodes 656a and 656b used to updated 3D map 645 of the environment which is an updated version of 3D map 640.

A way in which a 3D map such as that depicted in FIG. 6 is optimized is through the use of a global function which is to be optimized. In some examples, the global function is a non-linear least squares model. Two closely related problems that lead to similar non-linear least squares models are Pose Graph Optimization (PGO) and Bundle Adjustment (BA). Both PGO and BA can be used to establish maps of an environment from visual data and both problems define non-convex energy functions. Such energy functions are usually in the form of robustified non-linear least squares problems.

Advantageously, the methods and systems described herein enable problems, such as PGO and BA, to be scaled up to real-world problem instances and more efficiently process the increasing sizes of data and output maps. The methods and systems described herein further provide a solution to the large memory requirements of modern 3D map data. Indeed, the methods and systems described herein enable the optimization and updating of 3D maps in a distributed cloud environment. For example, arising from the method as described above and as depicted in FIG. 5, the present systems and methods are capable of optimizing 3D map data even where there is a node failure. The decentralized nature of the consensus step and the decentralized nature of the updating of the values of variables in a subgraph as described at blocks 510 and 512 in FIG. 5 respectively enable a robust optimization as the present methods and systems do not rely on a single node to perform all updates for the graph.

A non-linear least squares problem is an example of a separable function. In various examples, the separable function $f(z)$ is split into K parts such that $f(z):=\Sigma_k f_k(z)$, $z \in \mathbb{R}^N$. Where the function is split into K parts, it is possible to work on each of the K subproblems independently. This can be done, for example, on a dedicated worker node (such as a personal device, an HMD, a compute node in the data centre.) or on a dedicated processor from a plurality of processors within a machine. The K subproblems need not be of equal size and the size of each subproblem will vary depending on a number of factors such as the number of landmarks or poses per sub problem and the amount of observed data per sub problem. As a single subproblem is configured to fit entirely within a memory of a device, the subproblem can be solved more efficiently than if the subproblem were to be distributed over several devices.

Each subproblem $f_k: \mathbb{R}^{N_k} \to \mathbb{R}$ operates on a subset, of size $N_k$, of the variables of the graph. $N_k \leq N$ since some variables may be omitted from problem k. After partitioning, parts of z are duplicated and distributed over the network to K nodes that each solve a local problem $f_k$. The K nodes, for example, are the worker nodes of the communication network as described above in respect of FIGS. 5 and 6.

In various examples, a consensus variable is z and a consensus constraint Ax=Bz is introduced to enforce equality between duplicated variables at convergence of the consensus-based proximal algorithm. In this example, the problem to be solved becomes that of two variables x and z:

$$z, x = \arg\min_{(x_1,\ldots,x_k)^\top} \sum_k f_k(x_k) \text{ subject to } Ax = Bz \quad (1)$$

where:

$$A := I, B : (B_1|\ldots|B_k)^\top \text{ and } A \in \mathbb{R}^{\Sigma_k N k \times \Sigma_k N k}, \quad (2)$$

$$B_k \in \mathbb{R}^{\Sigma_k N k \times N}, x_k \in \mathbb{R}^{\Sigma_k N k}$$

Here, $B_k$ selects the subset of variables that occur in sub-problem k from z. Without loss of generality, it is assumed that there are only variables of z which occur in more than one subproblem. In some scenarios, all entries/variables of z occur in more than one subproblem. Where globally unconstrained variables across subproblems occur, that is, those variables that occur in only a single subproblem, in some examples, these are stored and updated locally during the optimization.

In some examples, after convergence, data is fetched from the respective worker node and re-inserted into the original z. Accordingly, A represents the identity matrix, I of $\mathbb{R}^{\Sigma_k N k}$. As A represents the identity matrix I, A may be omitted from being expressly written herein. $B_k$ is the identity matrix of $\mathbb{R}^N$ with rows removed of entries that do not occur in subproblem k. The set of subproblems of the original variable $z_s$ which occurs in z is defined by $\mathcal{K}(s):=\{k|z_s \text{ occurs in sub-problem } k\}$.

The set of indices occurring in subproblem k is denoted by $\mathcal{S}(k):=\{k|z_s \text{ occurs in sub-problem k}\}$. It is further assumed that the objective function $f$ is $L_f$-smooth, meaning $\nabla f$ is Lipshitz continuous with modulus $L_f$. Hence, $f$, fulfils the Descent Lemma: $f(x) \leq f(y) + \langle \nabla f(y), x - y \rangle + \frac{L_f}{2\|x-y\|^2}, \forall x, y.$ One way in which such a distributed problem is solved is using a consensus-based proximal algorithm. As described herein, a distributed problem is understood to be a problem which is separated into a plurality of subproblems. Examples of a consensus-based proximal algorithm are: Alternative Direction Method of Multipliers (ADMM) and Douglas Rachford Splitting (DRS). Convergence of ADMM in the non-convex setting is achieved under the assumption that the objective function fulfils a certain smoothness property (a (local) Lipshitz continuous gradient) and fulfills the Kurdyka-Lojasiewicz property, which is true for, for example, semi-algebraic functions. Both properties are fulfilled for the problems in the form of pose graph optimization PGO and bundle adjustment BA.

The augmented Lagrangian is given by:

$$\mathcal{L}(x, z, \mu) := \sum_k f_k(x_k) - \langle \mu_1, \ldots, \mu_k - B_k z \rangle + \frac{\rho k}{2}\|x_k - B_k z\|^2 + g(z), \quad (3)$$

and is optimized with respect to the variables z and x. For example, $\mathcal{L}$ is minimized with respect to the variables z and x $(x_1, \ldots, x_k)^T$ and is maximized with respect to the (dual) multipliers $\mu=(\mu_1, \ldots, \mu_K)^T$. Compared to the original formulation (1), a term g(z) is added onto the consensus variables z.

$$\frac{1}{\rho_k}$$

is interpreted as a step size of the respective subproblems. When considering, for example, a PGO problem, the variables $z=(z_1, \ldots, z_S)^T$ encode elements from the Lie group SE(3), that is, each $z_s$ encodes an element of SE(3) and there are S of those groups built from the N variables of z. To enforce this, $g(z):=\Sigma_{s=1}^{S} \iota_{SE(3)}(z_s)$, with $\iota_\Omega$ denoting the indicator function of the set $\Omega$, i.e. $\iota_\Omega(x)=0$, if $x \in \Omega$ and $\infty$ else.

As described above, the problem can be split into K parts, and it is possible to work on solving the subproblems independently on, for example, a dedicated worker node where the respective subproblem fits entirely into the memory of the dedicated worker node. Thus, in various examples, a solver is used to solve the subproblem. Where the problem is a non-linear least squares problem, a non-linear least squares solver is an example of a solver which is used to optimize the problem. Two examples of non-linear least squares solvers are the Gauss-Newton algorithm and the Levenberg-Marquardt algorithm.

Considering ADMM based on Gauss-Newton, given adequate step-sizes $$\frac{1}{\rho_k}$$

and after substituting $$\lambda_k := \frac{\mu_k}{\rho_k},$$

the non-convex problem in the form of (3) are solved by alternating the following iterates:

$$x^+ = (x_1^+, \ldots, x_k^+)^\top, x_k^+ = \arg\min f_k(x) + \frac{\rho_k}{2}\|x - B_k z - \lambda_k\|^2 \quad (4)$$

$$\lambda^+ = (\lambda_1^+, \ldots, \lambda_k^+)^\top, \lambda_k^+ := \lambda_k - (x_k^+ - B_k z) \quad (5)$$

$$z^+ = (z_1^+, \ldots, z_S^+)^\top, z_S^+ = \mathop{\arg\min}_{z \in SE(3)} \sum_{k \in \mathcal{K}(s)} \frac{\rho_k}{2}\|x_k^+ - z - \lambda_k^+\|^2 \quad (6)$$

The K independent subproblems in (4) occur as (robustified) non-linear least squares problems in the form $f_k(x_k):=\frac{1}{2}\Sigma_i \psi(h_{k,i}\|(x_k)\|^2)$, where $\psi$ is some robust kernel. Examples include the (smooth) truncated quadratic, Tukey's biweight or Chauchy's kernel. The non-linear least squares problems are solved the by a variant of the Gauss-Newton algorithm, for example Levenberg-Marquardt. Such methods are iterative in nature, often demanding many iterations before convergence and are referred to herein as 'local' (as in local per worker node) in contrast to the global iterates/steps of equations 4-6 above.

Approximating $f_k$ at the current solution $\overline{x_k}$ by $$f_k(x_k) \approx f_k(\overline{x_k}) + \langle \nabla f_k(\overline{x_k}), x_k - \overline{x_k}\rangle + \tfrac{1}{2}\|x_k - \overline{x_k}\|_{H_k}^2 \quad \text{(equation 7)}$$

Letting $J_i$ denote the Jacobian of $h_{k,i}$ at $\overline{x_k}$ and abbreviating the first and second derivative of $\psi$ at $\|h_{k,i}\overline{x_k}\|^2$ by $\psi'$ and $\psi''$, for instance, the former has $$H_k := \Sigma_i J_i^T (\psi'_i I + 2\psi''_i h_{ki}(\overline{x_k}) h_{ki}(\overline{x_k})^T) J_i \text{ and}$$

$$\nabla f_k(\overline{x_k}) := \Sigma_i \psi'_i J_i^T h_{ki}(\overline{x_k}).$$

Assume the minimal (maximal) eigenvalue of $H_k \forall k$ to be bounded throughout the algorithm by $\sigma_H \geq 0$ ($\Sigma_H$). For Triggs correction this is achieved by dropping the term involving the second derivative of the kernel, if $\psi'_i + 2\psi''_i \|h_{k,i}\overline{x_k}\|^2 < 0$. Then $\|.\|_{H_k} := \sqrt{\langle .,H_k.\rangle}$ denotes a semi-norm on $\mathbb{R}^{Nk}$. In the following the sub-index is dropped for clarity. Equation 4 can be minimized via an iterative scheme, getting the update $x_n := x^+$ from the previous solution $x_0 := x$ by running $n$ iterations of $$x_i = \underset{x_i}{\operatorname{argmin}} \tfrac{1}{2}\|x_i - x_{i-1}\|_{H_{x_{i-1}}}^2 + \eta I + \langle \nabla f_k(x_{i-1}), x_i - x_{i-1}\rangle + \quad \text{(equation 8)}$$

$$\frac{\rho}{2}\|x_i - z - \lambda\|^2$$

The approximate Hessian $H_{x_{i-1}}$ and gradient are formed at the previous iterate $x_{i-1}$. Adding $\eta > 0$ to the diagonal of the Hessian corresponds to an additional surrogate term $$\frac{\eta}{2}\|x_i - x_{i-1}\|^2$$

and relates to a trust-region around the current solution of the approximation. Performing any number of iterations can achieve convergence. The step sizes are set in accordance with the Lipshitz constant.

In an example the local updates of equation 8 of the primal variables are run until convergence and there is global convergence of the whole process of FIG. 5 if the step size is greater than two times the Lipshitz constant, i.e.

If $\rho_k > 2L_{f_k} \forall k$

If the Lipshitz constant $L_{f_k}$ is not known in advance it is estimated using a descent process. Evaluate subsequent iterates of the optimization at a worker node and update (increase if necessary) the estimate of the Lipshitz constant after each step and revert the step if the Lipshitz constant changes.

The inventors have found that there exist step sizes $\rho_k$ that ensure convergence of the process of FIG. 5 if n local update steps with a Gauss Newton approximated Hessian are used to update the primal variables. For a single step (n=1), convergence is ensured where:

$$\rho_k^2 + \sigma_{H\rho k} \geq \left(L_{f k} + \sum_H\right)_{\rho k} + 4\sum_H^2 + 4\left(\sum_H + L_{f k}\right)^2$$

Whilst it is described herein that the consensus-based proximal algorithm is used to ensure equality of variables which are shared between subgraphs and many global iterations have to be run before reaching global convergence, it appears wasteful to demand full convergence of the Gauss-Newton method performed on the sub-problems, especially not in each global step. It is shown that it is not needed to run Gauss-Newton until convergence. Instead fewer iterations can be run here without sacrificing global convergence of the full procedures, if the step sizes $$\frac{1}{\rho_k}$$

are adapted accordingly.

One way of terminating the iterates for the sub-problems at the individual worker nodes is to pre-define a number of iterations. This can be done in dependence of the global consensus or global iterations number. In an example, assume that running the algorithm for the sub problem at a worker node until convergence requires N=1000 steps (per sub problem). Assuming 100 global iterations are needed, this would induce a cost of 100 times 1000 steps per worker node plus 100 units for communications. On the other hand, if running only 100 local steps requires 200 updates, there is a cost of 200 times 100 steps per worker node plus 200 units for communications. In realistic scenarios, trading off communication and compute units, the latter is preferred, leading to a more efficient (in time and compute costs) algorithm. Dynamic schedules are also possible to improve overall costs such as by having fewer iterations of the local process at worker nodes in the beginning and more at the end. It is also possible to adapt the number of steps of the local problem per worker node individually and over time.

There are various ways in which a graph can be partitioned into a plurality of subgraphs. One such example of how a graph is partitioned is illustrated in FIG. 7.

Figure 7:
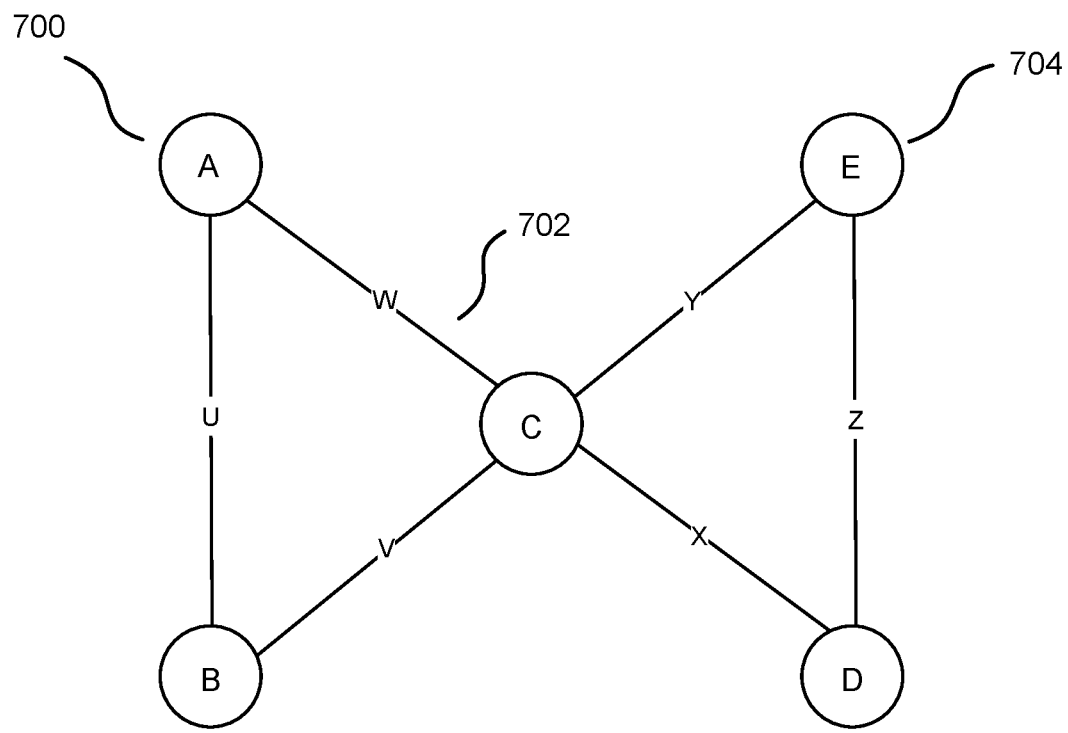
FIG. 7 is a schematic diagram of partitioning a graph into two subgraphs using edge-cutting.
Figure 7:
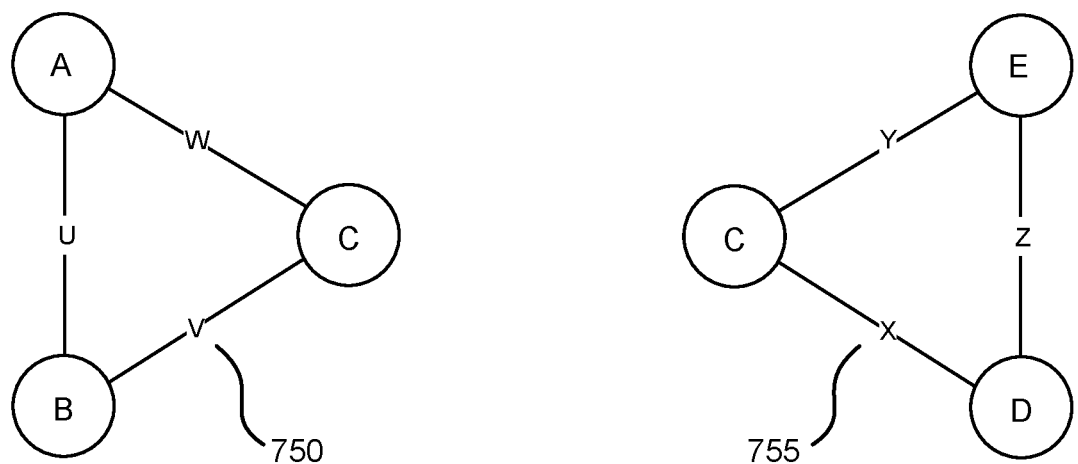

FIG. 7 shows a simplified example of how a graph 700 is partitioned into two subgraphs 706, subgraph L and subgraph M. Graph 700 comprises five nodes 704: A, B, C, D and E. A node represents one or more variables to be optimized, such as poses and/or landmarks as described above. Graph 700 further comprises six edges 702, wherein an edge connects two nodes together and represents relative information between variables. In FIG. 7, edge u connects nodes A and B, edge v connects nodes A and C, edge w connects nodes B and C, edge x connects nodes C and D, edge y connects nodes C and D and edge z connects nodes D and E.

The graph 700 is partitioned into the two subgraphs 706 using edge-partitioning. In edge-partitioning, edges of a graph are uniquely assigned in order to partition the graph into a plurality of subgraphs. In FIG. 7, edges u, v and w are uniquely assigned to subgraph L, resulting in a subgraph consisting of nodes A, B and C. Edges x, y and z are uniquely assigned to subgraph M, resulting in a subgraph consisting of nodes C, D and E. As depicted in FIG. 7, nodes A and B and nodes D and E uniquely appear in subgraphs L and M respectively. However, the node C, and any variables associated with node C, appears in both subgraph L and M.

Consequently, when computing an updated value of variable C in subgraph L and M, each graph will result in an updated value that is dependent on the other nodes and edges within the respective subgraph. In some cases, the updated value computed for a node which is shared between two or more subgraphs, such as node C shown in FIG. 7, will come to a consensus. In other cases, updated values computed for a node which is shared between two or more subgraphs will not come to consensus with updated values computed by another subgraph. For example, in the graph shown in FIG. 7, a computation performed on subgraph L may lead to a different value for one or more variables associated with node C than a computation performed on subgraph M. A subgraph 'L' can be considered to have an opinion about (or contribute to) the true value of the variable associated to graph node C. Subgraphs that do contain graph node C do not have an opinion (or contribute to) the true value of the associated variable. Furthermore, nodes come to a consensus about the 'best guess' for the shared variable (for example, graph node C) in the consensus step (by computing, for example, some weighted average of the corresponding local values for the variable computed at each subgraph).

In PGO, there are a set of N poses together with a collection of observations about the relative positioning of the poses. Information is contained within sensor data items is used to create a pose graph. In a pose graph, each pose is represented by a vertex and each observation is represented by an edge connecting two poses. An observation is a relative transformation between two poses that is given as part of the input. For example, odometry edges originate from an on-device odometry system. Visual edges are computed directly from shared observations between captured images. An objective of the present methods and systems is to assign a position and orientation $z(i) \in SE(3)$, where $SE(3)$ denotes the space of 6DOF poses in general, to each pose i in a manner that conforms as much as possible to the given observations.

This is formalized by considering the following objective:

$$f(z) = \min_{\substack{x(i) \in SE(3) \\ \forall i \in [n]}} \sum_{(i,j) \in E} \|e_{ij} - x(i)^{-1} x(j)\|^2 \quad (9)$$

Here $(i,j) \in E$ runs over all observations $e_{ij}$ in the input, which are compared against the transformation $x(i)^{-1} x(j)$ between pose i and pose j that is implied by the solution x.

When scaling up the size of the PGO problem and the number of worker nodes, this results in a bottleneck where a central node receives large volumes of data and is responsible for computing and communicating the consensus while other worker nodes idle.

As described herein, the decentralized nature of the present methods and systems are able to scale arbitrarily horizontally by adding more worker nodes so that the size of the graph can increase.

In various examples, partitionings are found such that for a fixed pose i, the collection S(i) of worker nodes replacing the variable will be small (even only one worker node). To avoid the bottleneck issue, prior to running a consensus-based proximal algorithm, such as ADMM or DRS, each pose i will elect a leader from S(i) responsible for finding consensus and communicating it to the other |S(i)−1| replicators.

Given a PGO problem:

$$f(x) = \Sigma_{ij} \ell_{ij}(x(i), x(j)) \quad (10)$$

the objective function $f$ is separated into p parts $f_1 + \ldots + f_p$ by dividing the individual error terms into subsets that induce each fs.

This distribution is modelled as a partitioning problem of the underlying pose graph. Define a graph G=(V, E) with a vertex for each pose (so |V|=n) and an edge for each observation, connecting the two poses, such as the poses of capture devices depicted in FIGS. 1 to 4, involved. Just as there is a correspondence between vertices and capture device poses, there is a correspondence between edges and observations. Thus, a splitting of $f$ is a partitioning of the edges $E = E_1 \cup \ldots \cup E_p$ ($i \neq j \Rightarrow E_i \cap E_j = \emptyset$), where a subset of edges $E_s$ induces a local objective $f_s$.

The distribution of observations across work nodes also implies which worker nodes are to replicate which variables—define $V(E_s)$ as the set of vertices that are incident to some edge in $E_s$.

There are various ways in which the graph/objective function can be partitioned. In some examples, the objective function is partitioned such that the local subproblems $f_s$ are of similar difficulty. One way in which the difficulty is approximated is to define that the subproblems have a similar size up to some tolerance $\epsilon$, such that for a plurality of the subproblems, $$|E_s| \leq (1 + \epsilon) \frac{|E|}{p} \quad (11)$$

As not all distributions are equal, if a single variable x(i) is fixed, it is desirable that its observations be distributed over as few worker nodes as feasible. Since pose graphs are generally connected, as illustrated in FIG. 7, performing an edge-cut can result in 'breaking up' some groups of observations that share a certain variable. The following two metrics are defined:

$$\text{excess}(\{E_s\}) = \Sigma_{v \in V} |\mathcal{O}(v)| - 1,$$

$$\text{vertex-cut}(\{E_s\}) = |\{v \in V : |\mathcal{O}(v)| > 1\}|. \quad (12)$$

The first metric can be rewritten as $(\Sigma_s |V(E_s)|) - |V|$, thus illustrating that it counts the number of 'extra' poses that are maintained relative to a sequential solver. The second metric counts the number of poses that are to be replicated across multiple worker nodes, without accounting for their multiplicity like the 'excess' metric does. As an example, the partitioning in FIG. 7 has an excess and vertex-cut of 1.

More detail about the situation where the graph is a co-visibility graph and the optimization uses bundle adjustment is now given.

In bundle adjustment (BA), there are n capture devices with observations of a subset of m landmarks (3D points in space with an associated feature description). Each observation corresponds to a 2D point on a captured image that has been identified with a landmark using the feature descriptor. Using BA, each landmark is assigned to a point $x_i$ in $\mathbb{R}^3$. Using BA, it is also possible to associate each capture device with a pose $y_j$ in SE(3) in a way that is consistent with the observations.

As a plurality of nodes (management node(s) and worker nodes) participate in the communication of information in the communication network as both sender and/or receiver, the network traffic is spread out more equally.

A covisibility matrix W is defined as:

$$W = \begin{cases} w_{ij} = 1, \text{ if capture device } j \text{ has observed landmark } i \\ w_{ij} = 0, \text{ otherwise} \end{cases}$$

If $w_{ij}=1$, there is an observation of landmark I on capture device j at $u_{ij} \in \mathbb{R}^2$ in image space.

Three ways of converting a sparse matrix such as covisibility matrix W into a hypergraph are:

Row net model. A hypergraph with a vertex for each column, and a net (or hyperedge, subset of vertices) for each row. The net for row i contains all the vertices (columns) j so that an arbitrary hypergraph is nonzero.

Column net model. The same as the row net model, with the roles of columns/rows reversed.

Fine-grain model. A hypergraph with a vertex for each nonzero, and a net for every row and for every column.

Considering the row/column net models, it is assumed that the vertices of e.g. the row net model are partitioned into p parts (corresponding top nodes). The matrix $W_s$ is built by selecting the columns of (hypergraph) part s. Communication is then components of $y_i$ and the number of fan-out edges for $y_i$ is equal to the number of parts present in net i, minus one.

For the fine-grain model, the parts of the partitioned hypergraph corresponds to the non-zeros of the matrix $W_s$. Communication involves both x and y, and in total again are equal to a sum over the nets where the number of parts present in each net is counted, minus one.

More formally, let H=(V, E) be a hypergraph. Let $\pi$ be a partitioning, $\pi(v)$ be the part to which v is assigned, and $\lambda(e)$ be the number of distinct parts inside a net e. The load l(s) is the size (number of vertices) of parts. The auxiliary partitioning problem to minimize communication is:

$$\operatorname*{argmin}_{\pi} \sum_{e \in E} (\lambda(e) - 1). \tag{13}$$

$$\text{s.t. } \max_{s} \frac{p l(s)}{|V|} \leq 1 + \epsilon$$

Here, $\epsilon$ is a parameter setting a threshold allowed load imbalance (in terms of "fraction over the average"). In some instances, the threshold allowed load imbalance is the maximum allowed load imbalance.

Bundle adjustment (BA) has the following structure:

$$\operatorname*{argmin}_{x \in A^m, y \in B^n} \sum_{i=0}^{n-1} \sum_{j \in W_i} f_{ij}(x_i, y_j). \tag{14}$$

Consider the sparse (covisibility) matrix W as described above. Rows of W correspond to landmarks, while columns correspond to capture devices.

The covisibility matrix, in some examples, is partitioned as $W = \sum_{s=1}^{p} W_s$, which accordingly separates the objective function into p distinct parts. A nonzero element $W_{ij}$ contained in part $W_s$ induces a dependency of parts on the input data $x_i$ and $y_j$.

The BA problem can be rewritten in consensus form by replicating the components $x_i$ and $y_j$ for each part s that require them and introducing an equality constraint to ensure that replicated components have the same value. In consensus-based proximal algorithms such as ADMM, steps alternate between minimizing the objective function, and satisfying the equality constraints.

Reducing, and in some cases minimizing, communication for decentralized averaging (and coupling) is achieved as follows:

Row net model. Only capture devices are replicated and communicated. This corresponds to 'camera consensus'.

Column net model. Point consensus: only landmarks are communicated.

Fine-grain model. Hybrid consensus: both points and landmarks are able to be replicated. An example of hypergraph partitioning for the model will automatically replicate highly visible landmarks (mountain top, town clock etc.) in addition to cameras where it is relevant. Note that where the data $x_i$ and $y_i$ are not the same size (for example, 3 floats versus 6 floats) it is possible to use weighted nets, where the row nets (corresponding to replicated cameras) are weighted double:

$$\Sigma_e c(e)(\lambda(e)-1), \tag{15}$$

where c(e) is the weight of an edge.

The introduction of a hypergraph partitioning model in general, the decentralized operation, as well as the move to hybrid consensus where highly visible landmarks are also replicated gives significant efficiency and accuracy gains.

Figure 8:
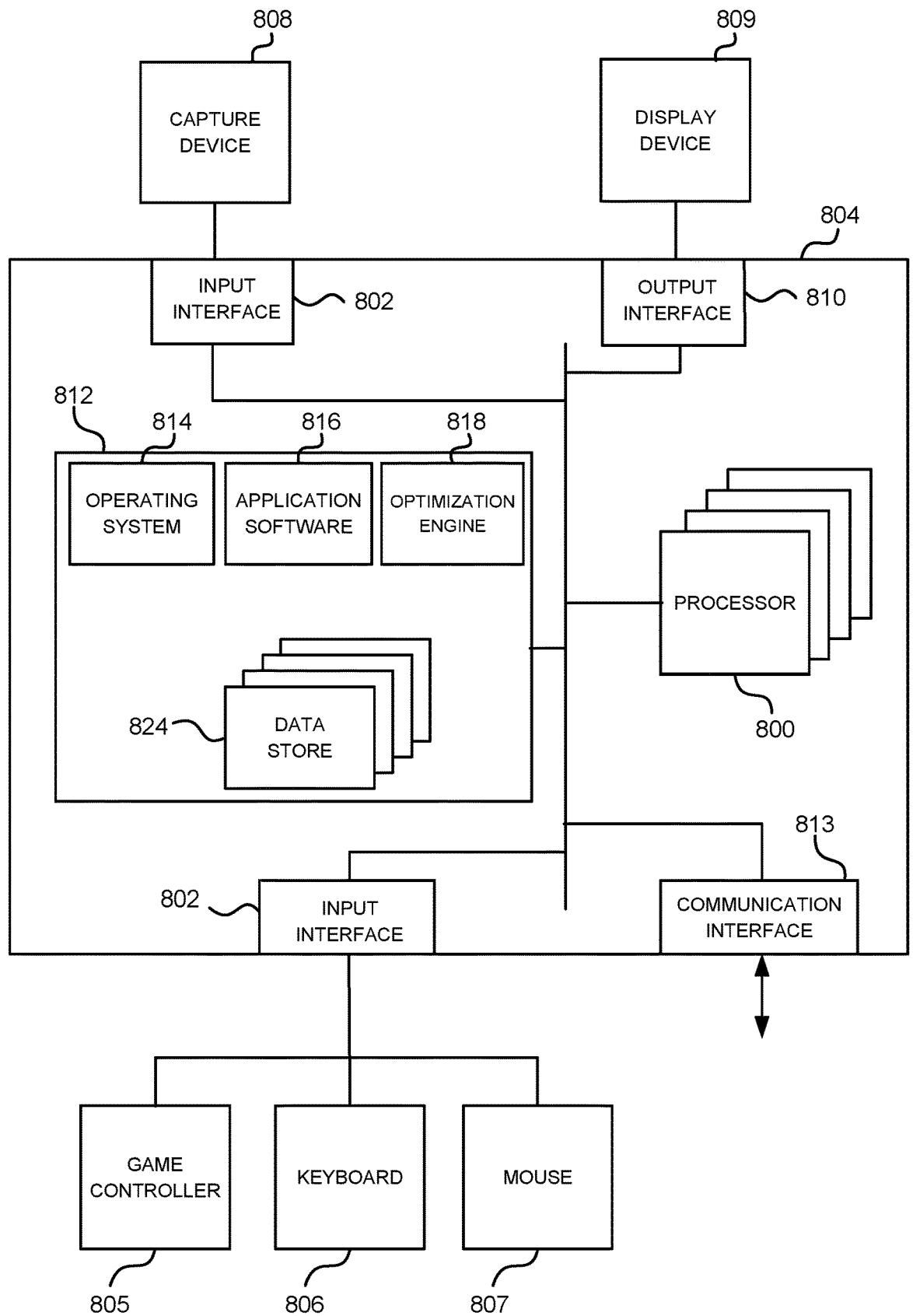
FIG. 8 illustrates an exemplary computing-based device in which embodiments as described herein are implemented.

FIG. 8 illustrates various components of an exemplary computing-based device 804 which may be implemented as any form of a computing and/or electronic device, and in which embodiments of a worker node or management node of the map updating functionality 118 of FIG. 1A may be implemented.

The computing-based device 804 comprises one or more input interfaces 802 arranged to receive and process input from one or more devices, such as user input devices (e.g. capture device 808, a game controller 805, a keyboard 806, a mouse 807). This user input may be used to control software applications or to capture sensor data for updating a 3D map. For example, capture device 808 may be a mobile camera arranged to capture images of a scene such as color videos. The capture device 808 may be an IMU, accelerometer, gyroscope, depth camera, infra-red camera, red green blue video camera, or other capture device.

The computing-based device 804 also comprises an output interface 810 arranged to output display information to a display device 809 which can be separate from or integral to the computing device 804. The display information may provide a graphical user interface to display 3D maps, values of variables, sensor data or other information. In an example, the display device 809 may also act as the user input device if it is a touch sensitive display device. The output interface 810 may also output data to devices other than the display device, e.g. a locally connected printing device.

Computer executable instructions may be provided using any computer-readable media that is accessible by computing based device 804. Computer-readable media may include, for example, computer storage media such as memory 812 and communications media. Computer storage media, such as memory 812, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 812) is shown within the computing-based device 804 it will be appreciated that the storage may be distributed or located remotely and accessed via a network or other communication link (e.g. using communication interface 813).

Computing-based device 804 also comprises one or more processors 800 which may be microprocessors, controllers or any other suitable type of processors for processing computing executable instructions to control the operation of the device in order to provide real-time camera tracking. In some examples, for example where a system on a chip architecture is used, the processors 800 may include one or more fixed function blocks (also referred to as accelerators) which implement a part of the method of 3D map updating in hardware (rather than software or firmware).

Platform software comprising an operating system 814 or any other suitable platform software may be provided at the computing-based device to enable application software 816 to be executed on the device. Other software than may be executed on the computing device 804 comprises: optimization engine 818 for carrying out all or part of the method of FIG. 5. A data store 824 is provided to store data such as previously received 3D maps, registration parameters, user configurable parameters, sensor data or other data.

Alternatively or in addition to the other examples described herein, examples include any combination of the following:

Clause A. A method for updating a 3D map of an environment, the 3D map comprising sensor data items depicting the environment, each sensor data item having one or more associated variables, a variable being a pose of a capture device or a position of a landmark, the method comprising:
- receiving, at a management node of a communications network comprising a plurality of worker nodes, the sensor data items, the sensor data items having been captured by the capture devices;
- calculating a graph based at least in part on the received sensor data items, wherein the graph comprises nodes and edges, wherein a node represents at least one variable and wherein an edge represents relationships between variables;
- partitioning the graph into a plurality of subgraphs so as to reduce a number of variables shared between subgraphs;
- allocating each of the plurality of subgraphs to a respective one of the worker nodes;
- at each worker node, computing updated values of variables of the subgraph;
- updating values of variables which are shared between subgraphs to a common value using a consensus process;
- updating the 3D map according to the updated values of the variables.

Clause B. The method of clause A, wherein at each worker node, the process of computing updated values of variables of the subgraph comprises computing an optimization of the subgraph and wherein, for at least one worker node, the optimization of the subgraph stops before convergence.

Clause C. The method of clause B, comprising repeatedly alternating the steps of:
- computing the subgraph optimization at the worker node; and
- updating the shared variables to a common value using a consensus process;
- and wherein the method comprises using a variable number of optimization steps at the subgraph optimization at the worker nodes, and using a variable number of optimization steps of the consensus-based proximal process.

Clause D. The method of any preceding clause, comprising setting a step size of an optimization process used at each worker node according to a specified upper bound to ensure convergence but take as large as possible steps.

Clause E. The method of any preceding clause, comprising dynamically adapting the subgraphs during operation of the method according to load balancing measurements observed from the worker nodes.

Clause F. The method of any preceding clause wherein the consensus-based proximal process is decentralized.

Clause G. The method of clause F, wherein updating the values of variables which are shared between subgraphs comprises introducing one or more consensus terms at each worker node and wherein the consensus-based proximal algorithm is configured to use the one or more consensus terms to ensure equality amongst the variables shared between subgraphs.

Clause H. The method of clause F, wherein the decentralization is achieved by forming a virtual cluster of worker nodes for each variable and designating one worker node per virtual cluster to receive data from other worker nodes in the virtual cluster, use the received data to compute an update for consensus variables shared within that virtual cluster, and to send the update to the worker nodes in the virtual cluster.

Clause I. The method of any preceding clause, wherein calculating the graph comprises using one or more of: odometry data indicating that two variables are to be connected by an edge because their associated sensor data items were captured sequentially according to the odometry data, and shared observations between captured images indicating that two variables are to be connected by an edge.

Clause J. The method of any preceding clause, wherein computing updated values of variables of the subgraph at a worker node comprises computing an optimization so as to assign a position and orientation in three dimensional world space to each pose in the subgraph in a manner that conforms as much as possible to the sensor data items.

Clause K. The method of clause J, comprising using a Gauss-Newton process or Levenberg-Marquardt process to compute the optimization at a worker node.

Clause L. The method of any preceding clause, wherein the consensus-based proximal process comprises Alternating Direction Method of Multipliers (ADMM) or Douglas Rachford Splitting (DRS).

Clause M. The method of any preceding clause, wherein the graph is either a pose graph where each node represents a pose of a capture device and edges represent relationships between poses, or the graph is a co-visibility graph representing a bundle adjustment process.

Clause N. The method of any preceding clause, wherein the one or more capture devices comprises one or more of: a camera, a light detection and ranging device LIDAR, an infrared camera, a time-of-flight camera or an inertial measurement unit, IMU.

Clause O. The method of any preceding clause, wherein the updated 3D map of the environment is used to create a digital twin of a real-world environment.

Clause P. The method of any preceding clause, wherein the updated 3D map of the environment is used for navigation of a human and/or robot.

Clause Q. The method of any preceding clause comprising using the updated 3D map of the environment to persist a hologram.

Clause R. The method of any preceding clause comprising using the updated 3D map of the environment for mobile camera localization.

Clause S. A communications network for updating a 3D map of an environment, the 3D map comprising sensor data items depicting the environment, each sensor data item having one or more associated variables, a variable being a pose of a capture device or a position of a landmark, the communications network comprising:
  a management node;
  a plurality of worker nodes;
  one or more processors; and
  computer storage memory having computer-executable instructions stored thereon which, when executed by the one or more processors, cause the one or more processors to:
    receive, at the management node, the sensor data items, the sensor data items having been captured by the capture devices;
    calculate a graph based at least in part on the received sensor data items, wherein the graph comprises nodes and edges, wherein a node represents at least one variable and wherein an edge represents relationships between variables;
    partition the graph into a plurality of subgraphs so as to reduce a number of variables shared between subgraphs;
    allocate each of the plurality of subgraphs to a respective one of the worker nodes; at each worker node, compute updated values of variables of the subgraph;
    update values of variables which are shared between subgraphs to a common value using a consensus process;
    update the 3D map according to the updated values of the variables.

Clause T. A communications network for updating a 3D map of an environment, the 3D map comprising sensor data items depicting the environment, each sensor data item having one or more associated variables, a variable being a pose of a capture device or a position of a landmark, the communications network comprising:
  a management node;
  a plurality of worker nodes;
  one or more processors; and
  computer storage memory having computer-executable instructions stored thereon which, when executed by the one or more processors, cause the one or more processors to:
    receive, at the management node, the sensor data items, the sensor data items having been captured by the capture devices;
    calculate a graph based at least in part on the received sensor data items, wherein the graph comprises nodes and edges, wherein a node represents at least one variable and wherein an edge represents relationships between variables;
    partition the graph into a plurality of subgraphs so as to reduce a number of variables shared between subgraphs;
    allocate each of the plurality of subgraphs to a respective one of the worker nodes;
    at each worker node, compute updated values of variables of the subgraph;
    update values of variables which are shared between subgraphs to a common value using a consensus process;
    update the 3D map according to the updated values of the variables;
    wherein computing updated values of variables of the subgraph at a worker node comprises computing an optimization so as to assign a position and orientation in three dimensional world space to each pose in the subgraph, and a position to each landmark, in a manner that conforms as much as possible to the sensor data items.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A method for updating a three dimensional (3D) map of an environment, the 3D map comprising sensor data items depicting the environment, the method comprising:
receiving, at a management node of a communications network comprising a plurality of worker nodes, the sensor data items, each of the sensor data items having an associated variable, a variable being a pose of a capture device or a position of a landmark, the sensor data items having been captured by the capture devices, wherein the landmark is located within the environment;
using at least the received sensor data items, calculating a graph, wherein the graph comprises nodes and edges, wherein a node represents a variable and wherein an edge represents a relationships between variables;
partitioning the graph into a plurality of subgraphs;
allocating each of the plurality of subgraphs to a respective one of the worker nodes of the plurality of worker nodes;
at each worker node, computing updated values of the variables of the subgraph;
updating values of variables which are shared between subgraphs to a common value using a consensus process, the updating including performing a global optimization on the variables to constrain the values of the variables shared between the plurality of the subgraphs to be the same; and
updating the 3D map according to the updated values of the variables.

2. The method of claim 1, wherein at each worker node, the process of computing updated values of variables of the subgraph comprises computing an optimization of the subgraph and wherein, for at least one worker node, the optimization of the subgraph stops before reaching convergence.

3. The method of claim 2, comprising repeatedly alternating the steps of:
computing the subgraph optimization at the worker node; and
updating the shared variables to a common value using a consensus process;
and wherein the method comprises using a variable number of optimization steps at the subgraph optimization at the plurality of worker nodes, and using a variable number of optimization steps of the consensus process.

4. The method of claim 1, comprising dynamically adapting the subgraphs during operation of the method according to load balancing measurements observed from the worker nodes.

5. The method of claim 1 wherein the consensus process is decentralized.

6. The method of claim 5, wherein updating the values of variables which are shared between subgraphs comprises introducing one or more consensus terms at each worker node and wherein the consensus process is configured to use the one or more consensus terms to ensure equality amongst the variables shared between subgraphs.

7. The method of claim 5, wherein the decentralization is achieved by forming a virtual cluster of worker nodes for each variable and designating one worker node per virtual cluster to receive data from other worker nodes in the virtual cluster, use the received data to compute an update for consensus variables shared within that virtual cluster, and to send the update to the worker nodes in the virtual cluster.

8. The method of claim 1, wherein calculating the graph comprises using one or more of: odometry data indicating that two variables are to be connected by an edge because their associated sensor data items were captured sequentially according to the odometry data, and shared observations between captured images indicating that two variables are to be connected by an edge.

9. The method of claim 1, wherein partitioning the graph into a plurality of subgraphs comprises assigning the edges of the graph uniquely to the plurality of the subgraphs, and assigning a first subset of the nodes of the graph uniquely to the plurality of the subgraphs, while assigning a second subset of the graph comprises assigning remaining nodes, to the plurality of the subgraphs causing at least one node of the second subset and its associated variable to appear in all of the plurality of subgraphs.

10. The method of claim 2, comprising using a Gauss-Newton process or Levenberg-Marquardt process to compute the optimization at a worker node.

11. The method of claim 1, wherein the consensus process comprises Alternating Direction Method of Multipliers (ADMM) or Douglas Rachford Splitting (DRS).

12. The method of claim 1, wherein the graph is either a pose graph where each node represents a pose of a capture device and edges represent relationships between poses, or the graph is a co-visibility graph representing a bundle adjustment process.

13. The method of claim 1, wherein the one or more capture devices comprises one or more of: a camera, a light detection and ranging device LIDAR, an infrared camera, a time-of-flight camera or an inertial measurement unit, IMU.

14. The method of claim 1, wherein the updated 3D map of the environment is used to create a digital twin of a real-world environment.

15. The method of claim 1, wherein the updated 3D map of the environment is used for navigation of a human and/or robot.

16. The method of claim 1 comprising using the updated 3D map of the environment to persist a hologram.

17. The method of claim 1 comprising using the updated 3D map of the environment for mobile camera localization.

18. A communications network for updating a three dimensional (3D) map of an environment, the 3D map comprising sensor data items depicting the environment, the communications network comprising:
- a management node;
- a plurality of worker nodes;
- one or more processors; and
- computer storage memory having computer-executable instructions stored thereon which, when executed by the one or more processors, cause the one or more processors to:
- receive, at the management node, the sensor data items, each of the sensor data items having an associated variable, a variable being a pose of a capture device or a position of a landmark, the sensor data items having been captured by the capture devices, wherein the landmark is located within the environment;
- using at least the received sensor data items, calculate a graph, wherein the graph comprises nodes and edges, wherein a node represents a variable and wherein an edge represents a relationships between variables;
- partition the graph into a plurality of subgraphs;
- allocate each of the plurality of subgraphs to a respective one of the worker nodes of the plurality of worker nodes;
- at each worker node, compute updated values of the variables of the subgraph;
- update values of variables which are shared between subgraphs to a common value using a consensus process, the updating of the values of variables including performing a global optimization on the variables to constrain the values of the variables shared between the plurality of the subgraphs to be the same; and
- update the 3D map according to the updated values of the variables.

19. A non-transitory computer-readable medium storing computer-readable instructions for updating a three dimensional (3D) map of an environment, the 3D map comprising sensor data items depicting the environment the computer-readable instructions, when executed by a processor cause the processor to:
- receive, at a management node of a communication network comprising a plurality of worker nodes, the sensor data items, each of the sensor data items having an associated variable, a variable being a pose of a capture device or a position of a landmark, the sensor data items having been captured by the capture devices, wherein the landmark is located within the environment;
- using at least the received sensor data items, calculate a graph, wherein the graph comprises nodes and edges, wherein a node represents a variable and wherein an edge represents a relationships between variables;
- partition the graph into a plurality of subgraphs;
- allocate each of the plurality of subgraphs to a respective one of the worker nodes of the plurality of worker nodes;
- at each worker node, compute updated values of the variables of the subgraph;
- update values of variables which are shared between subgraphs to a common value using a consensus process; and
- update the 3D map according to the updated values of the variables;
- wherein computing the updated values of the variables of the subgraph includes performing a global optimization on the variables to constrain the values of the variables shared between the plurality of the subgraphs to be the same.

* * * * *